United States Patent [19]

Sakamoto et al.

[11] 4,060,765

[45] Nov. 29, 1977

[54] PRESS-TO-TALK TRANSCEIVER

[75] Inventors: Kenji Sakamoto, Takaichi; Osamu Kawaai, Tokyo, both of Japan

[73] Assignees: Sanyo Electric Co., Ltd.; A & A Japan, Ltd., both of Noriguchy, Japan

[21] Appl. No.: 715,621

[22] Filed: Aug. 18, 1976

[30] Foreign Application Priority Data

Aug. 20, 1975 Japan .................................. 50-101827

[51] Int. Cl.$^2$ ............................................ H04B 1/44
[52] U.S. Cl. ........................................ 325/21; 325/18
[58] Field of Search .................................. 325/18–22, 325/52; 179/1 C, 2 R, 2 E, 81 A

[56] References Cited

U.S. PATENT DOCUMENTS

| 2,369,193 | 2/1945 | Vrooman | 325/21 |
| 2,935,605 | 5/1960 | Mathieu | 325/21 |
| 3,613,003 | 10/1971 | Kubo et al. | 325/18 |
| 3,908,094 | 9/1975 | Deluegue | 179/81 A |

Primary Examiner—Robert L. Griffin
Assistant Examiner—Jin F. Ng
Attorney, Agent, or Firm—Darby & Darby

[57] ABSTRACT

A press-to-talk transceiver which emits a side tone of the signal being transmitted from the receiver of the handset of the transmitting operator during transmission, in which the transceiver is provided with a handset which has a receiver and a transmitter together as a unit, an antenna for transmission and reception, a signal processing circuit for the received signal which produces an audio signal from the received signal, an audio amplifier which amplifies the received or transmitted audio signal, an output circuit which supplies audio signals received, amplified by the audio amplifier, to the receiver of the handset, a signal processing circuit for the transmitted signal which produces a modulated signal from the audio signal to be transmitted amplified by the audio amplifier, a first press-to-talk switch which connects the antenna with the received signal processing circuit during reception and with the transmission signal processing circuit during transmission, a second press-to-talk switch which supplies received demodulated audio signals to the audio amplifier during reception and supplies audio signal being transmitted to the audio amplifier during transmission, and a side tone circuit which supplies a side tone of the transmitted signal amplified by the audio amplifier to the receiver of the handset.

8 Claims, 4 Drawing Figures

PRESS-TO-TALK TRANSCEIVER

BACKGROUND OF THE INVENTION

The present invention relates to a press-to-talk receiver having a handset which has a transmitter (or microphone) and a receiver (or speaker) which together, produce a weak side tone of the signal being transmitted by the transmitting operator from the receiver of the handset of the transmitting operator during transmission.

DESCRIPTION OF THE PRIOR ART

In many types of wire or wireless transceivers, a problem is encountered in that it is difficult for the transmitting operator to talk smoothly with the receiving operator because the transmitting operator is not sure that his speech is being received by the receiving operator. In order to solve this problem, a side tone system is used in which a weak tone of the signal being transmitted is emitted from the receiver of the transmitting operator. To do this the signal being transmitted is supplied to the receiver by a side tone circuit simultaneously with transmitting this signal to the receiver of receiving operator.

For example, in the usual wire type telephone in which transmission and reception take place at the same time using two wires, the side tone signal is emitted from the receiver by supplying the transmitted signal to the receiver of the transmitting operator by using a hybrid transformer.

In an interphone in which transmission and reception take place at the same time as in the case of the wire telephone, the side tone is emitted from the receiver by special balancing circuits which are provided with the main machine and the subsidiary machine.

In a press-to-talk wireless transceiver, the transmitter (or microphone) and the receiver (or speaker) are constructed separately. Therefore, when a side tone circuit is provided a problem can arise due to feedback caused by the tone emitted from the receiver entering the transmitter. To avoid this when using a transceiver, the receiver is switched off during transmission.

However, when the transmitter and the receiver are constructed separately, it is inconvenient in that the tone emitted from the receiver is also heard by others. Therefore, a handset which has a transmitter and a receiver together has recently come into use. Therefore, a problem exists to provide a side tone circuit for a press-to-talk transceiver which has a handset.

SUMMARY OF THE INVENTION

The object of the present invention is to provide a side tone circuit for a press-to-talk transceiver having a handset including a transmitter (or microphone) and a receiver (or speaker) to make it possible for the transmitting operator to talk with the receiving operator smoothly and being sure that his speech should be received by the receiving operator.

The object of this invention is achieved by a circuit which supplies the signal being transmitted by the transmitting operator amplified by an audio amplifier to the receiver of the handset of the transmitting operator through an impedance element.

DETAILED DESCRIPTION OF PREFERRED EMBODIMENT

The invention is described in detail hereinafter with refference to the drawings.

Figure 1:
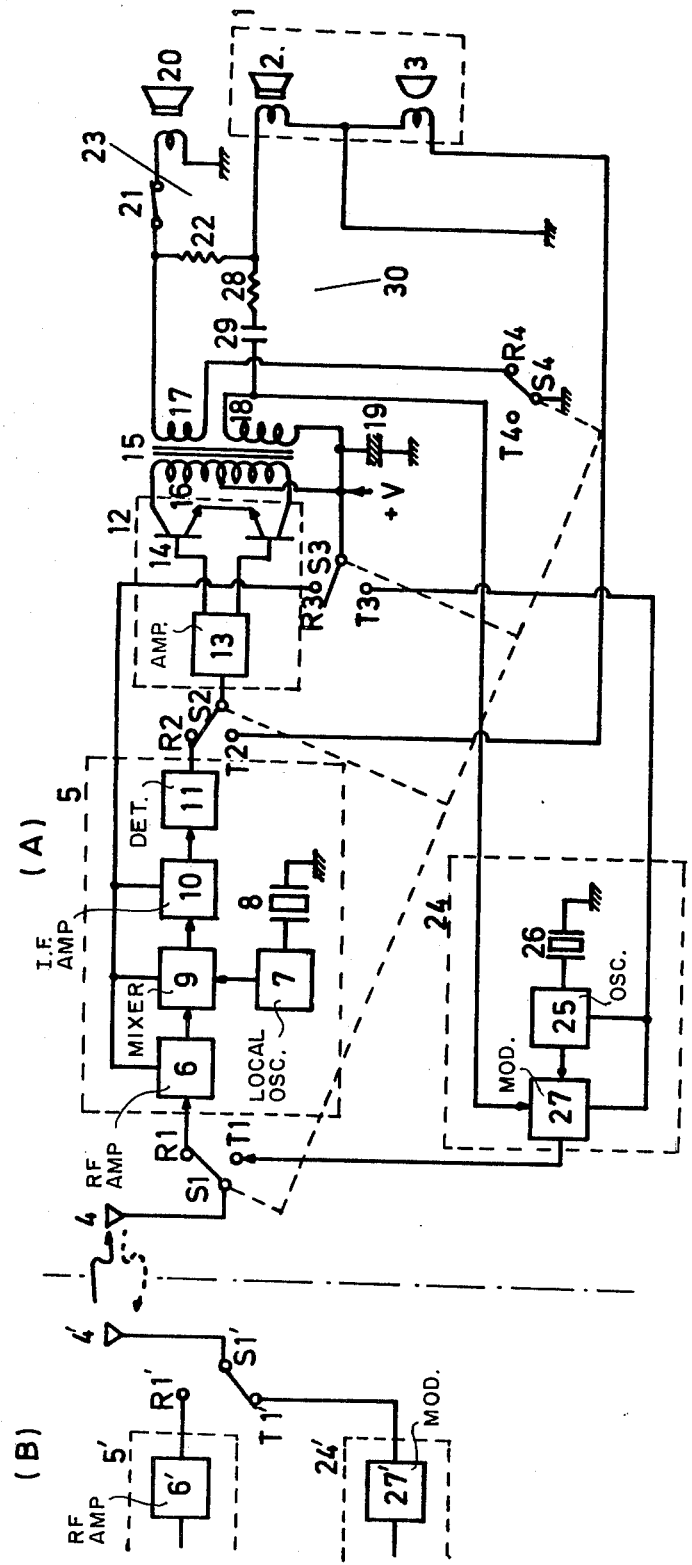
FIG. 1 shows a circuit diagram of one embodiment of the invention.

In FIG. 1, symbols A, B indicate two press-to-talk transceivers each having the same circuits. Only a part of the circuit of transceiver B is show. Numeral 1 indicates a handset of transceiver A which has a receiver (or speaker) 2 and a transmitter (or microphone) 3. An antenna 4 is provided for transmission and reception of signals by transceiver A. A received signal processing circuit 5 is provided which demodulates the received signal and produces an audio signal. Signal processing circuit 5 includes a high-frequency amplifier 6, a local oscillator 7 controlled by a crystal 8 and a mixer circuit 9 which mixes the received signal, after amplification by the high-frequency amplifier 6, and the local oscillator signal from the local oscillator 3. Processing circuit 5 also includes an intermediate-frequency amplifier 10, which amplifies the intermediate-frequency output signal from the mixer 9 and a detector 11 which detects the intermediate-frequency signal amplified by the intermediate-frequency amplifier 10 and produces an audio signal. An audio amplifier 12 amplifies the audio signal demodulated by the processing circuit 5.

Amplifier 12 is of conventional construction and has a dual function. It amplifies a received signal during reception. During transmission it serves as a modulation amplifier which amplifies and modulates the audio signal from the transmitter 3 of the handset 1 which is to be transmitted. Audio amplifier 12 has an interstage amplifier 13 and a power amplifier 14 connected to interstate amplifier 13. An output transformer 15 has primary, secondary, and third windings 16, 17 and 18. Symbol +V indicates a direct current (DC) power supply which supplies DC voltage to the center tap of the primary coil 16 and to one end of the third coil 18 of the output transformer 15. A capacitor 19 is connected between the input of the DC power supply +V and ground.

A speaker 20 is connected to the secondary coil 17 of output transformer 15 through a switch 21. A first resistor 22 is connected between the secondary coil 17 of the output transformer 15 and the receiver 2 of the handset 1. This forms an output circuit 23 which supplies received audio signals to the speaker 20. The receiver 2 is coupled to the secondary coil 17 of the output transformer 15 by the resistor 22 and to the speaker 20 by the first resistor 22 and the switch 21.

A transmission signal processing circuit 24 produces the modulated carrier wave signals from the audio signal amplified by the audio amplifier 12. The transmission signal processing circuit 24 includes a carrier frequency oscillator 25 provided with a crystal 26 and a final amplifier stage 27 in which the carrier wave signal from the carrier oscillator 25 is modulated by the audio signal to be transmitted from the third coil 18 of the output transformer 15.

A first press-to-talk switch S1 connects the antenna 4 to the input terminal R1 of the signal processing circuit 5 during reception and to the output terminal T1 of the transmission signal processing circuit 24 during transmission. A second press-to-talk switch S2 connects the input terminal of the audio amplifier 12 with either the output terminal R2 of the signal processing circuit 5 during reception or with the terminal of one side of the transmitter 3 of the handset 1 during transmission. S3 indicates a third press-to-talk switch which connects the terminal of the DC power supply +V with the power supply terminal R3 of the signal processing circuit 5 during reception or with the power supply terminal T3 of the transmission signal processing circuit 24 during transmission. S4 indicates a fourth press-to-talk switch which connects the terminal R4 to ground during reception to activate the output circuit 23 during reception. Switches S1, S2, S3 and S4 are ganged to be operated together.

A second resistor 28 comprises an impedance element connected with a coupling capacitor 29 between the upper end of the third coil 18 of the output transformer 15 and the receiver 2 of the handset 1. A side tone circuit 30 which supplies the audio signal to be transmitted to the receiver 2 is formed by the third coil 18 of the output transformer 15, the coupling capacitor 29, the second resistor 28, the receiver 2, ground, and the capacitor 19. The value of the resistance of the second resistor 28 is selected to be about 10 times that of the first resistor 22, for example, R(22) = 470($\Omega$), R(28) = 4.7(k$\Omega$).

The operations of the circuit is described below.

Consider that the press-to-talk switches S1, S2, S3 and S4 of the transceiver A are switched to the terminals R1, R2, R3 and R4 for reception and those of the transceiver B are switched to terminals T1, T2, T3 and T4 for transmission. When the modulated carrier wave signal is emitted from the antenna 4' of the transceiver B it is received by the antenna 4 of transceiver A. The received signal at transceiver A is demodulated to an audio signal by the signal processing circuit 5 formed by the high-frequency amplifier 6, the local oscillator 7, the mixer 9, the intermediate-frequency amplifier 10, and the detector 11. The audio signal produced by the processing circuit 5 is amplified by the audio amplifier 12, consisting of the inter-stage amplifier 13 and the power amplifier 14, and it is supplied to the speaker 20 through the secondary coil 17 of the output transformer 15. The audio signal is also supplied to the receiver 2 of the handset 1 through the coil 17 and the first resistor 22.

The demodulated audio signal is also supplied to the receiver 2 by the side tone circuit 30 comprising the third coil 18 of the output transformer 15, the coupling capacitor 29, the second resistor 28, the receiver 2, ground, and the capacitor 19. The power supplied to the receiver 2 by the side tone circuit 30, however, is at a reduced level and can be neglected because the value of the second resistor 28 is about ten times that of the first resistor 22.

When transmission is taking place from transceiver A, press-to-talk switches S1, S2, S3 and S4 are switched to the terminals T1, T2, T3 and T4. The audio signal from the transmitter 3 of the handset 1 is amplified by the audio amplifier 12 through the second press-to-talk switch S2 and appears on the third coil 18 of the output transformer 15. Carrier wave signal from the carrier oscillator 25 of the transmission signal processing circuit 24 is modulated by this audio signal in the transmit final stage 27 and it is radiated from the antenna 4. In this case, the audio signal to be transmitted which appears at the third coil 18 of the output transformer 15 is supplied to the receiver 2 by the side tone circuit 30 consisting of the third coil 18 of the output transformer 15, the coupling capacitor 29, the second resistor 28, the receiver 2, ground and the capacitor 19. A weak side tone is emitted from the receiver 2 of the handset 1.

Figure 2:
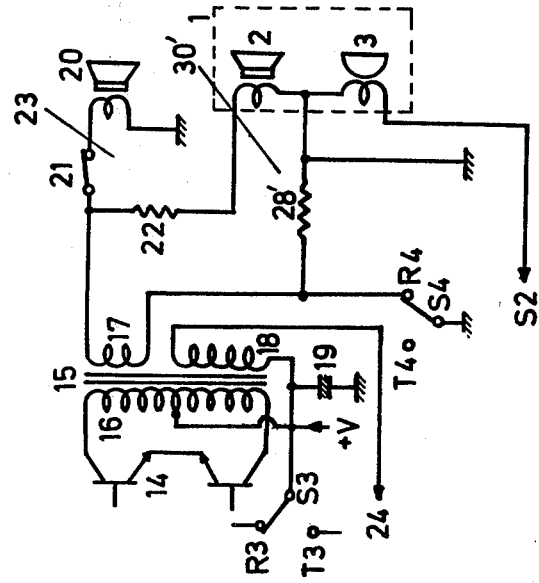

FIG. 2 shows another embodiment of the invention. Numeral 28' indicates the second resistor which is an impedance element inserted between the lower end of the secondary coil 17 of the output transformer 15 and the receiver 2 of the handset 1. A side tone circuit 30' is formed by the secondary coil 17, the first resistor 22, the receiver 2, and the second resistor 28'. The audio signal to be transmitted is emitted from the receiver 2 by this side tone circuit 30'. In addition, there is no loss of power due to the second resistor 28' because the second resistor 28 is short-circuited by the fourth press-to-talk switch S4 during reception.

Figure 3:
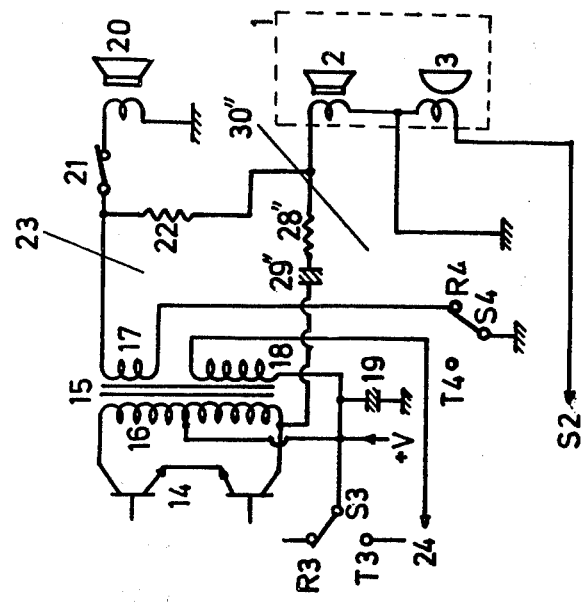
FIGS. 2, 3 and 4 show parts of circuit diagrams of other embodiments of the invention.

FIG. 3 shows a further example of the invention. Here, numeral 28" indicates the second resistor, i.e., an impedance element inserted with a coupling capacitor 29" between the primary coil 16 of the output transformer 15 and the receiver 2 of the handset 1. A side tone circuit 30" is formed by the primary coil 16, the coupling capacitor 29", the second resistor 28", the receiver 2, ground, and the capacitor 19. The side tone of audio signal being transmitted is emitted from the receiver 2 by this side tone circuit 30". The power supplied to the receiver 2 through the first resistor 22 from the primary coil 16 can be neglected because a large amount of power is supplied to the receiver 2 through the first resistor 22 from the secondary coil 17 during reception.

A side tone circuit which supplies the audio signal being transmitted directly from the primary amplifier 13 of the audio amplifier 12 to the receiver 2 can be provided.

Figure 4:
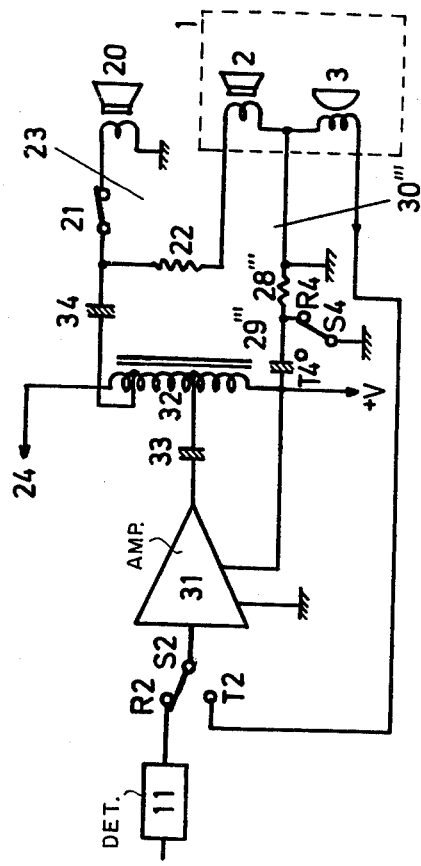

FIG. 4 shows another embodiment of this invention. Here, numeral 31 indicates an integrated circuit forming the audio amplifier 12, 32 indicates an auto-transformer used as the output transformer 15, 33 indicates a coupling capacitor which is connected between the output of the integrated circuit 31 and the intermediate terminal of the autotransformer 32. A coupling capacitor 34 is connected between the intermediate tap of the autotransformer 32 and the junction of the switch 21 and the first resistor 22. A coupling capacitor 29''' is connected between the DC power supply +V and the terminal R4 of the receive side of the fourth press-to-talk switch S4. A second resistor 28''', i.e., an impedance element, is connected between terminal R4 and ground. One end of the autotransformer 32 is connected to the DC power supply +V, the latter of which is also connected to the transmission signal processing circuit 24 (not shown).

In this embodiment the side tone circuit 30''' is formed by the autotransformer 32, the coupling capacitor 34, the first resistor 22, the receiver 2, the second resistor 28''', and the coupling capacitor 29''', a part of the transmitter signal is emitted from the receiver 2 by this side tone circuit 30'''. In addition, there is no loss of power by the second resistor 28''' during reception because the second resistor 28''' is short-circuited by the fourth press-to-talk switch S4 during this time.

As described above, it is possible for the transmitting operator to talk smoothly during transmission being sure that the transmission should be taking place since the side tone circuit provides a part of the transmitted signal which is emitted from the receiver 2 of the transmitting operator.

What is claimed is:

1. A press-to-talk transceiver comprising a handset having a receiver and a transmitter, antenna means for transmission and reception of a radio frequency signal, signal processing circuit means for producing an audio signal from a received radio frequency signal, audio amplifier means for amplifying the audio signal produced by said received signal processing circuit means and for amplifying an audio signal to be transmitted which is produced by said transmitter, output circuit means coupling the output of said audio amplifier means to said receiver of said handset for supplying the audio frequency signal amplified by said audio amplifier means to said receiver, transmission signal processing circuit means for producing a radio frequency signal to be transmitted modulated by the audio signal to be transmitted produced by said audio amplifier means, first press-to-talk switch means for selectively connecting said antenna means to said received signal processing circuit means during reception of a radio frequency signal and to said transmission signal processing circuit means during transmission of a radio frequency signal, second press-to-talk switch means for supplying the audio signal produced by said received signal processing circuit means to said audio amplifier means during reception of a radio frequency signal and for supplying the audio signal from said transmitter through to said audio amplifier means to said transmission signal processing circuit means during transmission, and side tone circuit means for supplying the audio signals to be transmitted as amplified by said audio amplifier means to said receiver of said handset.

2. A press-to-talk transceiver according to claim 1 wherein said output circuit means comprises transformer means having a primary winding coupled to the output of said audio amplifier means, a secondary winding coupled to the receiver of said handset for supplying the amplified audio signal thereto during reception, and a third winding for coupling the audio signal to be transmitted to said transmitted signal processing circuit means.

3. A press-to-talk transceiver according to claim 2 wherein said side tone circuit means comprises at least one impedance means coupled between said third winding of the output transformer of said output circuit means and said receiver of said handset.

4. A press-to-talk transceiver according to claim 2 wherein said side tone circuit means comprises at least one impedance means coupled between the secondary winding of said output transformer of said output circuit means and said receiver of said handset.

5. A press-to-talk transceiver according to claim 2 wherein said side tone circuit means comprises at least one impedance means coupled between the primary winding of said output transformer of said output circuit means and said receiver of said handset.

6. A press-to-talk transceiver according to claim 1 wherein said output circuit means comprises autotransformer means for coupling the output of said audio amplifier means to said receiver of said handset, said side tone circuit means comprising at least one impedance means coupled between a tap of said autotransformer means and said receiver of said handset.

7. A press-to-talk transceiver according to claim 1 wherein said side tone circuit means comprises at least one impedance element coupled between said audio amplifier means and said receiver of said handset.

8. A press-to-talk transceiver according to claim 1 wherein said side tone circuit means comprises at least one impedance means coupled between said output circuit means and said receiver of said handset.

* * * * *